United States Patent
Van Niekerk et al.

(10) Patent No.: US 9,771,847 B2
(45) Date of Patent: Sep. 26, 2017

(54) INTEGRATED LOAD BANK AND EXHAUST HEATER SYSTEM WITH LOAD SHED CAPABILITY FOR A DIESEL GENSET EXHAUST AFTERTREATMENT SYSTEM

(71) Applicant: CUMMINS CAL PACIFIC, LLC, Irvine, CA (US)

(72) Inventors: Herman Van Niekerk, Fullerton, CA (US); Eric G. Wiemers, Corona, CA (US); Mark Yragui, Coto de Caza, CA (US)

(73) Assignee: Cummins Cal Pacific, LLC, Irvine, CA (US)

( * ) Notice: Subject to any disclaimer, the term of this patent is extended or adjusted under 35 U.S.C. 154(b) by 288 days.

(21) Appl. No.: 13/706,309

(22) Filed: Dec. 5, 2012

(65) Prior Publication Data

US 2014/0150408 A1    Jun. 5, 2014

(51) Int. Cl.
| F01N 3/00 | (2006.01) |
| F01N 3/20 | (2006.01) |
| F01N 9/00 | (2006.01) |
| F01N 3/027 | (2006.01) |

(52) U.S. Cl.
CPC .......... *F01N 3/2013* (2013.01); *F01N 3/027* (2013.01); *F01N 3/2066* (2013.01); *F01N 9/00* (2013.01); *F01N 9/002* (2013.01); *F01N 2590/10* (2013.01); *F01N 2900/0422* (2013.01); *Y02T 10/24* (2013.01); *Y02T 10/26* (2013.01); *Y02T 10/47* (2013.01)

(58) Field of Classification Search
CPC ...... F01N 3/027; F01N 3/2013; F01N 3/2066; F01N 9/00; F01N 9/002; F01N 2590/10; F01N 2900/0422; Y02T 10/24; Y02T 10/26; Y02T 10/47

USPC ................... 60/274, 286, 295, 297, 303, 311
See application file for complete search history.

(56) References Cited

U.S. PATENT DOCUMENTS

| 3,092,757 A | * | 6/1963 | Rosenfeld et al. ............. 361/56 |
| 3,719,873 A | * | 3/1973 | Graf ..................... H02H 7/0833 |
| | | | 318/476 |
| 3,749,130 A | | 7/1973 | Howitt et al. |
| 3,842,678 A | | 10/1974 | De Baun et al. |

(Continued)

FOREIGN PATENT DOCUMENTS

| EP | 1612916 A1 | 1/2006 |
| EP | 1978241 B1 | 10/2008 |

(Continued)

OTHER PUBLICATIONS

Jacques Smuts (Smuts). 'Control Notes Reflections of a Process Control Practitioner' Jul. 2012 [online], [retrieved on Jan. 20, 2017]. Retrieved from the Internet through Wayback Machine <URL: http://blog.opticontrols.com/archives/153>.*

(Continued)

*Primary Examiner* — Mark Laurenzi
*Assistant Examiner* — Brandon Lee
(74) *Attorney, Agent, or Firm* — Faegre Baker Daniels LLP

(57) ABSTRACT

An integrated load bank and exhaust heater for a diesel genset exhaust aftertreatment system of the type having a diesel particulate filter (DPF) and a selective catalytic reduction (SCR) section. The load bank/heater can function as a load bank when testing the genset, as a heat source to optimize SCR efficiency, as to thermally regenerate the DPF filter.

11 Claims, 3 Drawing Sheets

(56) References Cited

U.S. PATENT DOCUMENTS

| | | | |
|---|---|---|---|
| 4,219,738 A * | 8/1980 | Griesinger | 290/40 R |
| 4,243,893 A | 1/1981 | Sten | |
| 4,608,946 A | 9/1986 | Tanaka et al. | |
| 4,733,750 A | 3/1988 | Poirier et al. | |
| 4,835,405 A | 5/1989 | Clancey et al. | |
| 4,907,546 A | 3/1990 | Ishii et al. | |
| 5,155,995 A | 10/1992 | Kinnear et al. | |
| 5,694,889 A | 12/1997 | Ball et al. | |
| 6,028,369 A | 2/2000 | Hirose et al. | |
| 6,401,455 B1 | 6/2002 | Mathes et al. | |
| 6,450,133 B1 | 9/2002 | Bernard et al. | |
| 6,630,756 B2 | 10/2003 | Kern et al. | |
| 6,784,574 B2 | 8/2004 | Turner et al. | |
| 6,865,883 B2 | 3/2005 | Gomulka | |
| 6,895,903 B2 | 5/2005 | Campion | |
| 6,904,815 B2 | 6/2005 | Widmer | |
| 7,007,966 B2 | 3/2006 | Campion | |
| 7,314,397 B2 | 1/2008 | Sodemann et al. | |
| 7,467,749 B2 | 12/2008 | Tarabulski et al. | |
| 7,482,705 B2 | 1/2009 | Piercey, III | |
| 8,146,349 B2 | 4/2012 | Bloms et al. | |
| 8,196,555 B2 | 6/2012 | Ikeda et al. | |
| 8,327,623 B2 * | 12/2012 | Raman | 60/286 |
| 8,459,216 B2 | 6/2013 | Klejeski et al. | |
| 8,826,649 B2 | 9/2014 | Li et al. | |
| 9,010,096 B2 | 4/2015 | Golin et al. | |
| 2002/0119081 A1 | 8/2002 | Latino et al. | |
| 2003/0093992 A1 | 5/2003 | Suga et al. | |
| 2003/0106309 A1 * | 6/2003 | Morimoto et al. | 60/295 |
| 2004/0172935 A1 | 9/2004 | Otake et al. | |
| 2004/0226287 A1 | 11/2004 | Edgar et al. | |
| 2006/0080971 A1 | 4/2006 | Smith et al. | |
| 2007/0130923 A1 * | 6/2007 | Dye et al. | 60/295 |
| 2007/0132243 A1 | 6/2007 | Wurtele et al. | |
| 2008/0129053 A1 | 6/2008 | Piercey | |
| 2008/0276599 A1 | 11/2008 | Hosaka | |
| 2008/0311010 A1 | 12/2008 | Boe | |
| 2009/0044524 A1 | 2/2009 | Fujino | |
| 2009/0173063 A1 | 7/2009 | Boorse et al. | |
| 2010/0005791 A1 | 1/2010 | Ranganathan et al. | |
| 2010/0023200 A1 | 1/2010 | Kurrle et al. | |
| 2010/0071351 A1 | 3/2010 | Nishimura et al. | |
| 2010/0082224 A1 | 4/2010 | Stretch | |
| 2010/0186373 A1 * | 7/2010 | Pierz et al. | 60/274 |
| 2010/0300083 A1 * | 12/2010 | Uemoto | 60/311 |
| 2010/0312445 A1 | 12/2010 | Bogema et al. | |
| 2011/0000194 A1 | 1/2011 | Gonze et al. | |
| 2011/0023452 A1 | 2/2011 | Gisslen et al. | |
| 2011/0107812 A1 | 5/2011 | Kasahara | |
| 2011/0146253 A1 | 6/2011 | Isada et al. | |
| 2011/0214415 A1 | 9/2011 | Thomas | |
| 2011/0214643 A1 | 9/2011 | Blizard et al. | |
| 2011/0232611 A1 | 9/2011 | Shaikh et al. | |
| 2011/0248511 A1 | 10/2011 | Marlenee et al. | |
| 2012/0003131 A1 | 1/2012 | Ibrahim et al. | |
| 2012/0121475 A1 | 5/2012 | van Niekerk | |
| 2012/0160934 A1 | 6/2012 | Ponnathpur et al. | |
| 2012/0173062 A1 | 7/2012 | Kumar et al. | |
| 2012/0180457 A1 | 7/2012 | Liu et al. | |
| 2012/0204542 A1 | 8/2012 | Norris et al. | |
| 2012/0208672 A1 | 8/2012 | Sujun et al. | |
| 2013/0213013 A1 | 8/2013 | Mitchell et al. | |
| 2013/0333355 A1 | 12/2013 | Lee et al. | |
| 2014/0150407 A1 | 6/2014 | Niekerk et al. | |
| 2014/0150433 A1 | 6/2014 | Niekerk et al. | |
| 2014/0154139 A1 | 6/2014 | Van Niekerk et al. | |

FOREIGN PATENT DOCUMENTS

| | | |
|---|---|---|
| JP | 6501760 B2 | 2/1994 |
| WO | WO2008079003 A1 | 7/2008 |
| WO | WO2012033704 A2 | 3/2012 |
| WO | 2014089172 A1 | 6/2014 |
| WO | 2014089173 A1 | 6/2014 |

OTHER PUBLICATIONS

International Search Report issued in International Application No. PCT/US2013/073043, mailed Apr. 28, 2014, 2 pages.
International Search Report issued in International Application No. PCT/US2013/073048, mailed Apr. 28, 2014, 2 pages.
"Control of Emissions of Air Pollution From Nonroad Diesel Engines and Fuel", Environmental Protection Agency, Federal Register, vol. 69, No. 124, Jun. 29, 2004, 316 pages.
40 CFR Chapter 1 (Jul. 1, 2012 Edition), Part 1039—Control of Emissions from New and In-Use Nonroad Compression-Ignition Engines, 80 pages.
Tier 4 Regulations Affect More than Engines, Jun. 6, 2011, downloaded from http://www.power-eng.com/articles/pring/volume-115/issue-6/features/tier-4-regulations-af.
International Preliminary Examination Report issued in PCT/US/2013/073048, completed Mar. 31, 2014, 10 pages.
International Preliminary Examination Report issued in PCT/US2013/073043, completed Jun. 9, 2015, 17 pages.

* cited by examiner

INTEGRATED LOAD BANK AND EXHAUST HEATER SYSTEM WITH LOAD SHED CAPABILITY FOR A DIESEL GENSET EXHAUST AFTERTREATMENT SYSTEM

TECHNICAL FIELD

The present invention relates generally to generator/engine sets (gensets). In particular, the invention is an exhaust aftertreatment system and operating method for gensets.

BACKGROUND

Diesel and other engine-powered generators (gensets) used as power sources (e.g., as stand-by or back-up power sources) are typically periodically tested to ensure their availability and reliability when needed. During these tests the generator can be connected to a load bank—a device that develops an electrical load and dissipates the power generated by the genset. The exhaust from the engines powering gensets is sometimes processed by aftertreatment systems to reduce emissions. Exhaust aftertreatment systems of these types are disclosed, for example, in the Pierz et al. U.S. Patent Application Publication No. 2010/0186373 and the van Niekerk U.S. Patent Application Publication No. 2012/0121475. There remains, however, a continuing need for improved exhaust after treatment systems.

SUMMARY

Embodiments of the invention are exhaust aftertreatment systems and methods of operation that provide enhanced efficiency. One embodiment is a method for operating a control system to control the application of power from a genset to a load bank/heater in an exhaust aftertreatment (AT) system of the type having a selective catalytic reduction (SCR) section coupled to the genset. The method includes: (1) applying power from the genset to the load bank/heater during genset operation to heat exhaust from the genset, (2) monitoring temperature of the exhaust in the AT system, and (3) regulating the amount of power applied from the genset to the load bank/heater during the genset operation to maintain the monitored temperature of the exhaust in the AT system within an SCR operating temperature range. The operating temperature of the SCR section can be optimized by this embodiment of the invention.

Another embodiment is a method for operating a control system to control the application of power from a genset to a load bank/heater in an exhaust aftertreatment (AT) system of the type having a diesel particulate filter (DPF) section and selective catalytic reduction (SCR) section coupled to the genset. The method includes: (1) operating the AT system in a run mode, (2) applying power to the load bank/heater during the run mode operation to heat exhaust from the genset, (3) monitoring temperature of the exhaust during the run mode operation, (4) regulating the amount of power applied to the load bank/heater during the run mode operation to maintain the temperature of the exhaust in the AT system within an SCR operating temperature range, (5) operating the AT system in a DPF filter regeneration mode, (6) applying power to the load bank/heater during the filter regeneration mode operation to heat exhaust from the genset, and (7) regulating the amount of power applied to the load bank/heater during the filter regeneration mode operation to maintain the temperature of the exhaust in the AT system within a DPF filter regeneration temperature range. Optionally AT system can also be run in one or more of: (1) a start-up regen mode when the genset is started, (2) a deep clean regen mode to extensively clean the DPF filter when monitored backpressure in the AT system exceeds certain levels, (3) a manual load mode by which an operator can use the AT system as a load bank during genset tests and select the load, and (4) a manual DFP filter regen mode. Effective operation of the DPF filter can be maintained by this embodiment of the invention.

Yet another embodiment is a method for operating a control system to control the distribution of power from a genset having an output power capacity to an electrical load powered by the genset and to a load bank/heater in an exhaust aftertreatment (AT) system coupled to the genset. The method includes: (1) applying power from the genset to the electrical load, (2) applying power from the genset to the load bank/heater to heat exhaust from the genset (3) monitoring power demand on the genset while applying power to the electrical load and the load bank/heater, and (4) reducing the amount of power applied to the load bank/heater when the monitored power demand on the genset is greater than the genset output power capacity. In some embodiments, reducing the amount of power applied to the load bank/heater includes reducing the amount of power applied to the load bank/heater by at least an amount about equal to an amount that the power demand on the genset exceeds the genset output power capacity. In other embodiments reducing the amount of power applied to the load bank/heater includes discontinuing the application of power to the load bank/heater when the amount of power demanded by the electrical load about equals or exceeds the genset output power capacity. The embodiment enables the AT system to be operated without the need to derate the genset unless the external load demand exceeds the genset capacity.

DETAILED DESCRIPTION

Figure 1:
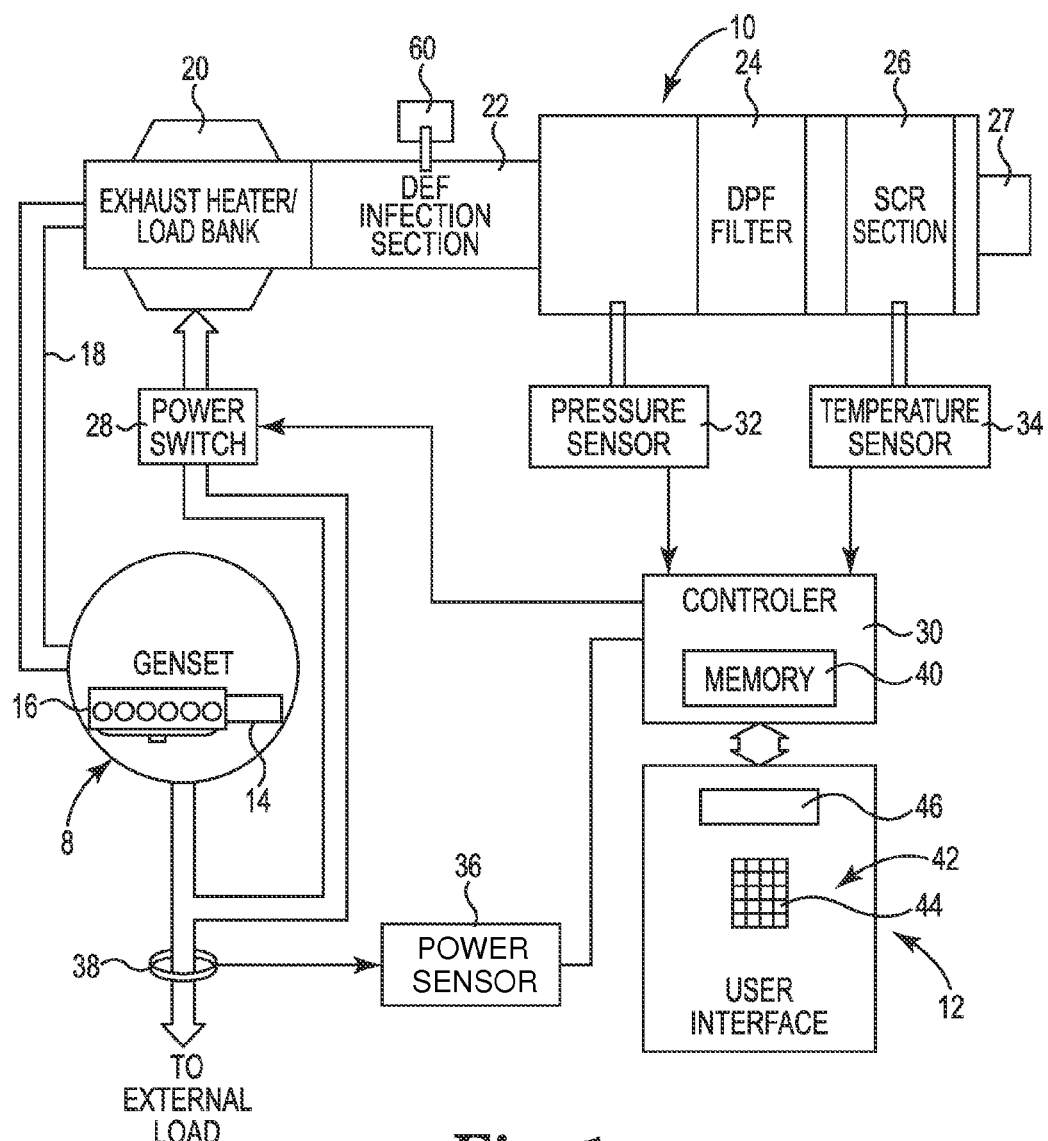
FIG. 1 is a diagrammatic illustration of a genset coupled to an exhaust aftertreatment system and control system in accordance with an embodiment of the invention.

FIG. 1 is a diagrammatic illustration of a genset 8 coupled to an exhaust aftertreatment (AT) system 10 and control system 12 in accordance with embodiments of the invention. Genset 8, which can be a commercially available device, includes an electrical generator 14 powered by a diesel or other engine 16. Electric power produced by the genset 8 is coupled to an external load (not shown). For example, genset 8 can be a back-up power supply for a building. The engine exhaust port 18 from the genset 8 is coupled to the exhaust aftertreatment system 10 for processing (e.g., the removal of emissions such as gas and/or particulate). The illustrated embodiment of aftertreatment system 10 includes a load bank/exhaust heater 20, diesel emission fluid (DEF) injection section 22, diesel particulate filter (DPF) 24 and selective catalytic reduction (SCR) section 26. As described in greater detail below, the load bank/heater 20 is configured to function both as a heater to heat the exhaust gas in connection with the operation of the aftertreatment system 10, and to function as a load bank for the genset 8 (e.g., during genset tests when the genset is not connected to the external load, such as during a test operation or a periodic (monthly, bi-weekly) standby genset exercise mode operation). Power from the genset 8 is applied to the load bank/heater 20 through a power transfer switch 28 in response to a command signal from the control system 12 to provide the load bank and exhaust heating functions.

As shown, the illustrated embodiment of the control system 12 includes a controller 30 that is coupled to an aftertreatment system pressure sensor 32 and temperature sensor 34, as well as to a genset output power sensor 36 and the power switch 28. Controller 30 is a programmed processor-based device and includes program memory 40 in the illustrated embodiment. Program instructions, set point data and other information causing the controller 30 to provide the functionality described herein can be stored in the memory 40. The controller 30 can take other forms, such as a programmed logic controller (PLC) or hardwired discrete circuit elements in other embodiments. A user interface 42 is coupled to the controller 30 to enable the operation of the aftertreatment system 10 and control system 12. The user interface includes a keypad 44 and display 46 in the illustrated embodiment, but user interfaces such as touch screen graphic user interfaces can be used in other embodiments.

Pressure sensor 32 monitors the pressure in the aftertreatment system 10 at a location upstream from the DPF filter 24 (i.e., the back pressure in the aftertreatment system), and provides signals representative of the monitored pressure to the controller 30. Temperature sensor 34 monitors the temperature in the aftertreatment system 10 and provides signals representative of the monitored temperature to the controller 30. The controller 30 produces a command signal representative of the amount of power to be coupled from the genset 16 to load bank/heater 20. In one embodiment the power switch 28 is a silicon controlled rectifier (SCR)-based switch that is responsive to the command signals from the controller 30. In the illustrated embodiment the power sensor 36 is coupled to a current transformer 38 and provides signals to the controller 30 representative of the total power demand on (and produced by) the genset 16 (i.e., the sum of the power demand by the external load and the power applied to the load bank/heater). Because of the control of power switch 28, the controller 30 has information representative of the amount of power that is being applied to the load bank/heater 20. The controller 30 can compute the power demand from the external load by subtracting the load bank/heater power from the power measured by power sensor 36. In other embodiments of the invention the amount of power demanded by the external load and the load bank/heater can be determined by other approaches and power sensors.

Figure 2:
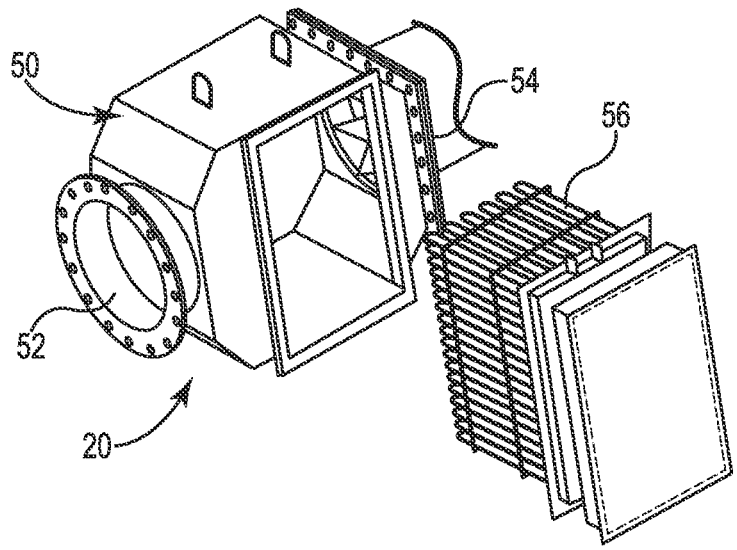
FIG. 2 is a detailed exploded illustration of an embodiment of the load bank/heater shown in FIG. 1.

FIG. 2 is a detailed exploded illustration of a load bank/heater 20 in accordance with one embodiment of the invention. As shown, the load bank/heater 20 includes a housing 50 having an inlet end 52 and an outlet end 54. A set of resistive elements 56 are located in the housing 50 between the inlet end 52 and the outlet end 54 (the elements are shown outside the housing in FIG. 2 for purposes of illustration) and are electrically coupled to the power switch 28. Exhaust from the genset engine 16 is coupled to the inlet end 52 of the housing 50, and will flow past the resistive elements 56 before exiting the housing at outlet end 54. Power applied to the resistive elements 56 through power switch 28 will heat the resistive elements and therefore the exhaust flowing past the resistive elements. The amount of exhaust heating by the load bank/heater 20 can be controlled through the amount of power applied to the resistive elements 56. Other embodiments of the invention can use other load bank/heaters. In one embodiment the duty cycle of the power applied to the resistive elements 56 is modulated to control the load presented to the genset, such as by silicon controlled rectifiers or other electrical switch element. In yet another embodiment, resistive elements 56 are individually electrically coupled or decoupled to control the amount of the presented load. In one embodiment of the present invention, the load bank/heater 20 allows control of the exhaust gas temperatures to within +/−10° F. of a selected target.

As shown in FIG. 1, the exhaust from the load bank/heater 20 flows to the DEF injection section 22. A DEF injector 60 injects diesel emission fluid (DEF) such as urea into the injection section 22 where it is dispersed into and mixed with the exhaust. The exhaust then passes through the DPF filter 24 which removes particulate matter such as soot from the exhaust stream. The filtered exhaust then passes through the catalyst-containing SCR section 26 where the injected DEF and NOx (nitrogen oxides) in the exhaust react in an oxidizing atmosphere to chemically wash out the NOx before the exhaust is released into the environment through the outlet 27. For example, in systems using automotive grade DEF such as a urea-based solution, the DEF is injected into the exhaust upstream of the catalyst. The urea decomposes and hydrolyzes to form ammonia (NH3) which, in the presence of the SCR catalyst, reacts with the NOx in the exhaust to produce nitrogen, water and carbon dioxide (CO2). An aftertreatment system 10 that can be used in connection with the genset 8 and control system 12 is described in greater detail in copending U.S. patent application Ser. No. 13/706,038, filed on even date herewith and entitled Exhaust Aftertreatment Packaging System For A Diesel Genset, the entire disclosure of which is expressly incorporated herein by reference for all purposes. A DEF injector 60 that can be used in connection with the aftertreatment system 10 is described in greater detail in copending U.S. patent application Ser. No. 13/706,082, filed on even date herewith and entitled Diesel Exhaust Fluid Injector Assembly, the entire disclosure of which is expressly incorporated herein by reference for all purposes. In the illustrated embodiment of the invention the DPF filter 24 can be uncatalyzed, allowing the DPF filter to be located downstream of the DEF injection section 22 without significant risk of the injected DEF degrading a subsequent DPF filtration catalyst. Other aftertreatment systems and DEF injectors can be used in other embodiments of the invention. Still other embodiments of the invention do not include one or the other of the DPF filter 24 and the SCR section 26.

SCR section 26 typically operates at optimum efficiency within a certain temperature range. For example, some urea-based SCR sections can operate efficiently at temperatures in a range around about 600° F. As described in greater detail below, control system 12 can operate to control the load bank/heater 20 to heat and maintain or regulate the temperature of the exhaust in the system 10 within a predetermined SCR operating temperature range. In one embodiment, control of the load bank/heater 20 is used to guarantee a minimal exhaust temperature floor. The SCR operating temperature range can include all or part of the optimum SCR operating temperature to enhance the performance of the SCR section 26. It is also noted that this feature of the present invention also enables the use of alternative catalysts or aftertreatment approaches that have differing temperature ranges or smaller optimum operating temperatures.

DPF filter 24 collects particulate such as soot present in the exhaust. The amounts of particulate in the exhaust and collected by the DPF filter 24 can depend on a number of factors such as the length of time that the engine 16 is running and the load on the generator. For example, at moderate to high loads the DPF filter will be experiencing higher temperatures in the exhaust stream and have a tendency to burn off or oxidize trapped particulate matter as a matter of course, while at low loads particulate matter will tend to accumulate due to the lower exhaust temperature being experienced. As the filtered particulate collects or accumulates on the DPF filter 24 the filter can become plugged and constrict the exhaust flow through the filter and system 10. The pressure in the system 10 upstream from the DPF filter 24, sometimes referred to as the backpressure, increases as a result of the constricted exhaust flow. As described in greater detail below, to clear or regenerate the DPF filter 24, control system 12 can operate to control the load bank/heater 20 to heat and maintain the temperature of the exhaust in the system 10 to a temperature and/or time period that causes the particulate to burn off the DPF filter 24 and oxidize, thereby regenerating the DPF filter. It is noted that the load imposed by the load bank/heater 20 to heat the exhaust in the system 10 will also have the beneficial secondary effect of increasing the load on the engine of the genset, thereby additionally increasing the exhaust temperature. For example, temperatures in a range around about 960° F. are suitable to recharge some DPF filters. Because at least portions of the DPF filter regeneration temperature are typically higher than the optimum SCR operating temperature range, it can be advantageous to minimize the amount of time that the system 10 is operated at the DPF filter regeneration temperatures. In addition, higher exhaust gas temperatures can degrade the DEF and/or increase NOx production, reducing DEF effectiveness and requiring an increased DEF injection rate.

Figure 3:
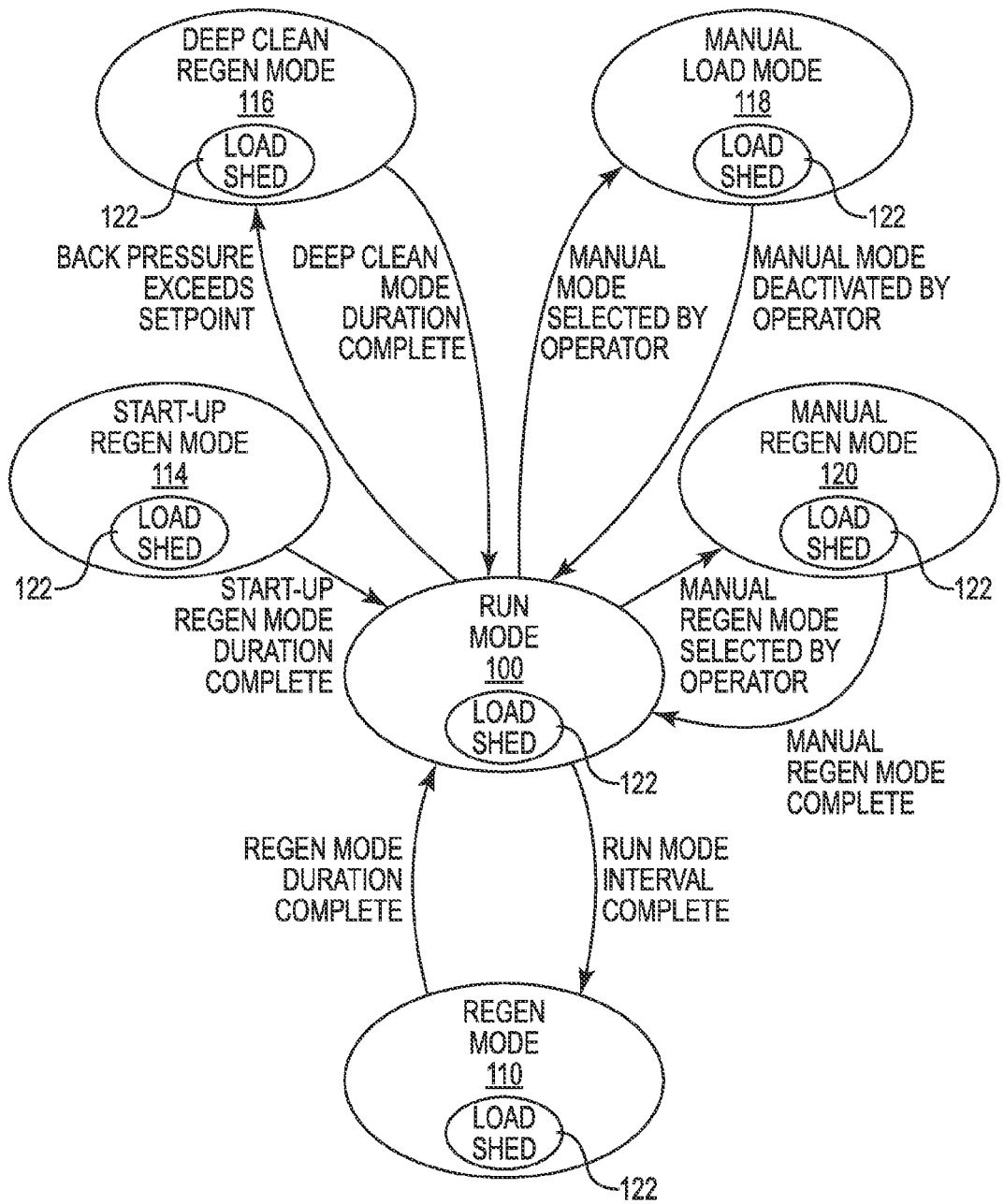
FIG. 3 is a diagrammatic illustration of the operation of the aftertreatment system and control system shown in FIG. 1 in accordance with one embodiment of the invention.

FIG. 3 is a diagrammatic illustration of the manner by which control system 12 operates the exhaust aftertreatment system 10 in accordance with embodiments of the invention. Run mode 100 is the default or "normal" operating mode in which the aftertreatment system is typically operated. During the run mode 100 the control system 12 causes the aftertreatment system 10 to operate at temperatures that are suitable or advantageously optimized for efficient operation of the SCR section 26. Control system 12 periodically switches the aftertreatment system 10 between the run mode 100 and operation in a regen mode 110. During the regen mode 110 the control system 10 causes the aftertreatment system 10 to operated in a manner that will regenerate the DPF filter 24. In some embodiments the aftertreatment system 10 is operated in a start-up regen mode 114 when the genset 8 is started from a stopped condition. In the start-up regen mode the aftertreatment system 10 is operated in a manner that will regenerate the DPF filter 24 immediately after start-up. It is noted that this start-up regen mode will also have the effect of heating the aftertreatment system up to operating temperature quickly, assisting in overcoming the cold thermal mass of the aftertreatment system and bringing the SCR and DPF up to operating temperature so that they "light off" and begin treatment of particulate material and NOx in the exhaust. Other embodiments of the invention include a deep clean regen mode 116 in which the aftertreatment system 10 is operated in a manner that can produce a more extensive regeneration of the DPF filter 24 than the regen mode 110. Through actuation of the user interface 42 an operator can optionally cause the control system 12 to operate the aftertreatment system 10 in one of both of a manual load mode 118 and a manual regen mode 120. In the manual load mode 118 the control system 12 causes an amount of electrical power selected by the operator to be applied to the load bank/heater 20 (i.e., power is applied to the load bank/heater as a function of the operator-selected settings). In the manual regen mode 120 the control system 12 causes the aftertreatment system 10 to be operated in a manner that will regenerate the DPF filter 24.

Run Mode 100—As noted above, run mode 100 is the default or "normal" operating mode for the aftertreatment system 10. During the run mode 100 the controller 30 regulates the amount of power applied to the load bank/heater 20 to maintain the temperature of the exhaust in the SCR section 26 within a predetermined SCR operating temperature range. As discussed above, the SCR operating temperature range can include temperatures at which the SCR section 26 operates most efficiently. In one embodiment of the invention the SCR operating temperature range can be around an SCR temperature of about 600° F. This SCR operating temperature can be the same or higher than the temperature of the exhaust as it exits the engine 16. Setpoint and other data representative of control parameters such as the desired SCR temperature and the predetermined operating range can be stored in the memory 40. The exhaust temperature in the aftertreatment system 10 can be monitored by the temperature sensor 34 and used by the controller 30 during the run mode 100.

In some embodiments of the invention the aftertreatment system 10 discontinues operation in the run mode 100 after certain run mode durations or intervals. In one embodiment the run mode interval is variable and based on factors such as the average load on the genset 8 during the run mode 100. For example, if the average load is relatively high, the exhaust produced by the genset 8 may have relatively low amounts of particulate, resulting in the need for less frequent and/or shorter duration regenerations of the DPF filter 24. Similarly, more frequent and/or more extensive DPF filter 24 regeneration cycles may be appropriate if the genset 8 is running at loads and is producing relatively more soot that is collected by the DPF filter or has run too long at low loads or idle. In still other embodiments the run mode 100 has a predetermined duration. Setpoint and other data representative of the control parameters used to control the interval or duration of the run mode 100 can be stored in the memory 40. The average load on the genset can be determined by the controller 30 from the signals representative of monitored power provided by the power sensor 36 or recent engine throttle settings.

Regen Mode 110—The control system 12 switches the aftertreatment system 10 from the run mode 100 to a regen mode 110 following completion of the run mode interval or duration in one embodiment of the invention. During the regen mode 110 the control system 12 regulates the application of power to the load bank/heater 20 to maintain the temperature in the aftertreatment system 10 within a predetermined DPF filter regen temperature range, and for a sufficient time, to regenerate (i.e., remove particulate from) the DPF filter 24. As noted above, the load imposed by the load bank/heater 20 to heat the exhaust in the system 10 will also have the effect of increasing the load on the system 10, thereby having the effect of additionally increasing the exhaust temperature. Typically the regen temperature is greater than the SCR operating temperature. In one embodiment of the invention the regen temperature range can be a range around a regen temperature of about 960° F. The duration of the regen mode 110 is about 1 hour in some embodiments of the invention, but can be other lengths in other embodiments. In still other embodiments the duration of the regen mode 110 can vary based on one or more factors such as the length of time that the aftertreatment system 10 operated in the run mode 100. In the illustrated embodiment the control system 12 causes the aftertreatment system 10 to switch from the regen mode 110 back to the run mode 100. In this embodiment the aftertreatment system 10 periodically cycles between the run mode 100 and the regen mode 110 during routine operation. Setpoint and other data representative of the control parameters such as the desired regen mode temperature, the regen temperature range and the duration of the regen mode can be stored in the memory 40. The exhaust temperature in the aftertreatment system 10 can be monitored by the temperature sensor 34 and used by the controller 30 during the regen mode 110.

Start-Up Regen Mode 114—In some embodiments of the invention, when the genset 8 is started from a stopped state (e.g., when stand-by power is demanded from the genset, or when the genset is being tested), the control system 12 can operate the aftertreatment system 10 in a start-up regen mode 114 before switching to the run mode 100. During the start-up regen mode 114 the control system 12 regulates the application of power to the load bank/heater 20 to maintain the temperature in the aftertreatment system 10 within a predetermined DPF filter start-up regen temperature range, and for a sufficient period of time, to regenerate the DPF filter 24 before operating the system in the run mode 100. Any particulate remaining in the DPF filter 24 following the shut-down of the genset 8 is thereby removed. In one embodiment of the invention the start-up regen temperature range can be a range around a regen temperature of about 960° F. The duration of the start-up regen mode 114 is about 1 hour in some embodiments of the invention, but can be other lengths in other embodiments. As noted above, this start-up regen mode also aids in overcoming the thermal mass of the cold aftertreatment system, heating the aftertreatment system up to operating temperature quickly and helping to quickly begin treatment of particulate material and NOx in the exhaust. In still other embodiments the duration of the start-up regen mode 114 can vary based on one or more factors. Following completion of the start-up regen mode 114 the control system operates the aftertreatment system 10 in the run mode 100 in the illustrated embodiment.

Deep Clean Regen Mode 116—Control system 12 can optionally operate the aftertreatment system 10 in a deep clean regen mode 116 in some embodiments of the invention. During the deep clean regen mode 116 the control system 12 regulates the application of power to the load bank/heater 20 to maintain the temperature in the aftertreatment system 10 within a predetermined DPF filter deep clean regen temperature range, and for a sufficient time period, to regenerate the DPF filter 24. Operation of the aftertreatment system 10 in the deep clean regen mode 116 will typically provide a more extensive or thorough regeneration of the DPF filter 24 than operation in the regen mode 110. In one embodiment of the invention, for example, the deep clean regen temperature range can be a range around a deep clean regen temperature of about 960° F., but can be other temperatures in other embodiments. The duration of the deep clean regen mode 114 is about 2 hours in some embodiments of the invention, but can be other lengths in other embodiments. In still other embodiments the duration of the manual regen mode 110 can vary based on one or more factors such as the back pressure monitored by the pressure sensor 32.

In embodiments of the invention the control system 12 automatically switches the aftertreatment system 10 to the deep clean regen mode 116 when monitored factors or conditions indicate the need for regeneration of the DPF filter 24. This deep clean regen mode 116 occurs asynchronously from the usual cycle of the run mode 110 and regen mode 110. In one embodiment of the invention, for example, control system 12 monitors the back pressure in the system 10 and initiates the deep clean regen mode 116 when the monitored back pressure exceeds a predetermined set point (i.e., a pressure indicating excessive soot loading of the DPF filter 24). Setpoint and other data representative of the control parameters such as the desired deep clean regen temperature, the deep clean regen temperature range, the duration of the deep clean regen mode and the backpressure that triggers the deep clean regen mode can be stored in the memory 40. Following completion of the deep clean regen mode 114 the control system operates the aftertreatment system 10 in the run mode 100 in the illustrated embodiment. In other embodiments of the invention (not shown) the deep clean regen mode 116 can be entered from and discontinued into other operating modes.

Manual Load Mode 118—Embodiments of the invention optionally enable the operator to use the control system 12 to operate the aftertreatment system 10 in one or more manual modes including a manual load mode 118 and a manual regen mode 120. The manual load mode 118 can, for example, be used by an operator to when it is desired to use the load bank/heater 20 as a load bank when testing the genset 8. An operator can actuate the user interface 42 to select the manual load mode 118 and the amount of power to be applied to the load bank/heater 20 to select the amount of load (or resistance) presented to the genset 8. In response, the control system 12 will apply the selected amount of power to the load bank/heater 20. During operation in the manual load mode 118 the operator can adjust the load up or down using the interface 42, and the control system 12 will respond accordingly. In one alternative embodiment, an exhaust temperature is selected by the operator and the load is varied to maintain this temperature. The operator can also discontinue or stop the manual load mode 118 through use of the user interface 42. In the illustrated embodiment the manual load mode 118 can only be entered from the run mode 100, and operation of the aftertreatment system 10 switches back to the run mode when the manual load mode is discontinued. In other embodiments of the invention (not shown) the manual load mode 118 can be entered from and discontinued into other operating modes.

Temperature-Based Load Shed Operation—Control system 12 performs a temperature-based load shed operation during the manual load mode 118 in some embodiments of the invention. This load shed operation can help prevent damage to the SCR section 26 or other components of the aftertreatment system 10 that might be caused by excessive exhaust gas heat. Setpoint and other data representative of a manual mode maximum temperature is stored in memory 40. During operation in the manual load mode 118, controller 30 uses the temperature sensor 34 to monitor the temperature in the aftertreatment system 10. If the monitored temperature in the aftertreatment system 10 exceeds the manual mode maximum temperature, the controller 30 controls the power switch 28 to reduce the amount of power applied to the load bank/heater 20 to reduce the temperature of the exhaust gas to appropriate levels. In effect, the temperature-based load shed operation during the manual load mode 118 overrides the load selected by the operator to prevent possible damage to the aftertreatment system 10.

Manual Regen Mode 120—By selecting a manual regen mode 120 the operator can run a regeneration cycle of the DPF filter 24 asynchronously with filter regenerations during other operating modes such as 110, 114 and 116. The operator can initiate the manual regen mode 120 by actuating the user interface 42. During the manual regen mode 120 the control system 12 regulates the application of power to the load bank/heater 20 to maintain the temperature in the aftertreatment system 10 within a predetermined DPF filter manual regen temperature range that will regenerate the DPF filter 24 (e.g., about 960° F. in one embodiment). In one embodiment, control system 12 is configured to operate aftertreatment system 10 in the manual regen mode 120 for a predetermined period of time (e.g., two hours) after the mode is initiated. In other embodiments the length of the manual regen mode can vary based on factors such as the pressure monitored by the pressure sensor 32. In still other embodiments the operator can end or discontinue the manual regen mode 120 by actuating the user interface 42. In the illustrated embodiment the manual regen mode 120 can only be entered from the run mode 100, and operation of the aftertreatment system 10 switches back to the run mode when the manual regen mode 120 is discontinued. In other embodiments of the invention (not shown) the manual regen mode 120 can be entered from and discontinued into other operating modes.

In still other embodiments, operation of the aftertreatment system 10 can be initiated using interfaces (not shown) other than the user interface 42. For example, in embodiments the control system 12 can be coupled to other control systems such as an industrial control system controlling the overall operation of a facility that includes genset 8 and aftertreatment system 10, in addition to other equipment. In yet other embodiments the control system 12 can be coupled to a genset controller. In still other embodiments the control system can be coupled to devices used by service personnel. Any or all of these devices, which may be at locations remote from control system 12, can be used to initiate operation of the aftertreatment system 10 in the manual regen mode 120. Similarly, other operating modes of the aftertreatment system 10 can be initiated using other interfaces and/or from other locations.

Figure 4:
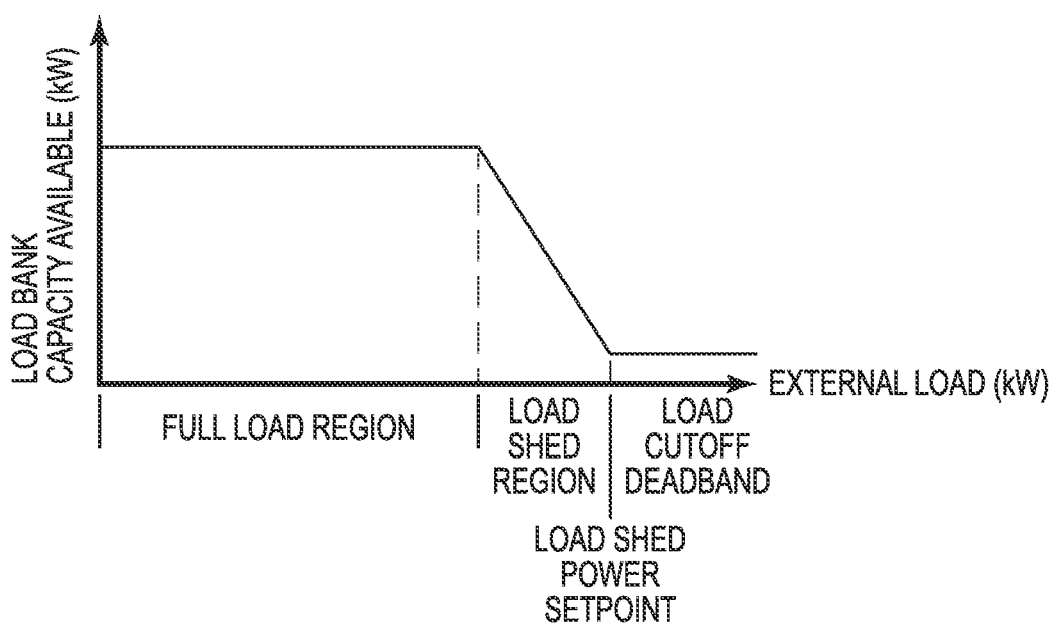
FIG. 4 is a diagrammatic illustration of the operation of the aftertreatment system and control system shown in FIG. 1 in an overload-based load shed mode.

Overload-Based Load Shed Mode—Control system 12 operates the aftertreatment system 10 in an overload-based load shed mode 122 when the total power demand on the genset 8 (i.e., the sum of the external load and the load bank/heater load) exceeds the maximum capacity of the genset or a selected maximum genset output load level. The overload-based load shed mode 122 can be described with reference to FIG. 4. As shown, during a full load region when the external load demands relatively low loads, the load bank/heater 20 can demand any load up to the maximum capacity of the load bank/heater. When the external load demands relatively higher amounts of power and the total power demand on the genset is greater than the genset capacity (or the selected maximum genset output level) but the external load demand is less than the genset capacity, the control system 12 operates the aftertreatment system 10 in a load shed region. In the load shed region the amount of power applied to the load bank/heater 20 is reduced by an amount proportional to the amount by which the total power demand exceeds the genset capacity. In one embodiment, for example, the control system 12 will reduce the power applied to the load bank/heater 20 by an amount generally equal to the amount by which the total power demand exceed the genset capacity. When the external load demands amounts of power greater than the genset capacity, the control system 12 operates the aftertreatment system 10 in a load cutoff dead band at which no power is applied to the load bank/heater 20. It is noted, however, that in this dead band region the exhaust temperature will be naturally elevated due to the load present on the genset. Data representative of the overload-based load shed operation including a setpoint characterizing the full load region-load shed region transition and a load shed power set point characterizing the transition from the load shed region to the load cutoff dead band (e.g., a setpoint representative of the maximum capacity of the genset) can be stored in the memory 40 and used by the controller 30. The overload-based load shed mode 122 effectively prevents the genset 8 from being artificially "derated" or placed into an overload condition when the aftertreatment system 10 is demanding power by providing precedence to the external load demand over the load bank/heater demand. It is noted that this load demand may not be uniform and so in one embodiment, the genset utilizes hysteresis or a time window after experiencing a spike in load demand that has caused load shed, requiring that either load drop below a selected level or that a selected time period has passed before restoring power to load bank/heater 20. In yet another embodiment, the differential, second order differential, or simple rate of change of an increase in demand is used to preemptively shed load by the load bank/heater 20 if the rate of increase is deemed to be to great and likely to cause a load shed event In the embodiment illustrated in FIG. 3, the overload-based load shed mode 122 can be entered from all of operating modes 100, 110, 114, 116, 118 and 120, and operation of the aftertreatment system 10 switches back to the mode in which the system was operating when the overload-based load shed mode was entered. In other embodiments the overload-based load shed mode 122 can be entered from one or more but not all of operating modes 100, 110, 114, 116, 118 and 120, and can be discontinued into other operating modes. Still other embodiments of the invention do not include the overload-based load shed mode 122.

In another embodiment of the invention (not shown), the load bank/heater 20 can also be connected to a power source different than the genset 8, and operated by controller 12 using the alternative power source to preheat or maintain the temperature of the aftertreatment system 10 above the surrounding ambient temperature when the genset 8 is not operating or in a standby mode. It is noted that in this mode of operation a small blower can be used to flow air through the aftertreatment system 10, possibly with a small recirculation duct to efficiently keep and transfer heat within the system 10. The aftertreatment system 10 can then be brought up to operating temperatures more quickly when the genset 8 is started, increasing the efficiency of operation.

Mass Flow-Based Load Shed Operation—For example, in some embodiments (not shown) the genset 8 and power switch 28, and therefore load bank/heater 20, are coupled in parallel to a power supply bus coupled to one or more additional gensets. In such embodiments, some or all of the power to the load bank/heater 20 may be provided by the other genset(s). In these embodiments the proper operation and service life of the load bank/heater 20 may rely upon a cooling effect of the exhaust passing through the load bank/heater. If the genset 8 coupled to the load bank/heater 20 was to be operated at a relatively low load and was not generating sufficient exhaust flow to maintain the load bank/heater within appropriate temperatures, the operation and/or service life of the load bank/heater might be detrimentally impacted. To reduce the possibility of any such impact, control system 12 optionally operates in a mass flow-based load shed mode in some or all of the operating modes described above. During the mass flow-based load shed operation the control system 12 limits the power applied to the load bank/heater 20 as a function of the load provided by the genset 8 to which the load bank/heater is coupled through exhaust port 18. The load provided by the genset 8 is representative of the amount of exhaust gas flowing through the load bank/heater 20. In one embodiment the controller 30 includes a mass flow heater limit setpoint (e.g., 50 kW in one embodiment) stored in memory 40. During operation, controller monitors the power provided by the genset 8, and limits the power applied to the load bank/heater 20 to a value equal to the sum of the monitored power from the genset and the mass flow heater limit setpoint. By this load shed operation the amount of power applied to the load bank/heater 20 can be maintained to within levels that may not detrimentally impact the load bank/heater.

Aftertreatment and control systems in accordance with the invention offer important advantages. They can, for example, increase the DPF filter and/or SCR section operating efficiency. Generator fuel and DEF consumption can be enhanced while at the same time decreasing the amounts of detrimental particulate and gas in the exhaust. In one embodiment the exhaust temperatures can be maintained to within +/−10° F. of desired temperatures.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

The invention claimed is:

1. A method of distributing power from a genset having an output power capacity to an electrical load powered by the genset and to a load bank/heater in an exhaust after treatment (AT) system coupled to the genset, the method including:
    delivering an amount of power from the genset to the electrical load;
    delivering an amount of power from the genset to the load bank/heater to heat exhaust from the genset;
    monitoring power demand on the genset while delivering power to the electrical load and the load bank/heater;
    determining whether the monitored power demand on the genset is greater than one of a selected output power capacity and genset output power capacity;
    delivering a reduced amount of power to the load bank/heater in response to the monitored power demand on the genset being greater than one of the selected output power capacity and the genset output power capacity;
    determining a selected time window for when the reduced amount of power is delivered to the load bank/heater based on data representative of over-load based load shedding operations;
    determining whether the selected time window has passed; and
    restoring the amount of power applied to the load bank/heater in response to the selected time window passing.

2. The method of claim 1 wherein the step of delivering the reduced amount of power to the load bank/heater includes discontinuing the application of power to the load bank/heater when the amount of power demanded by the electrical load about equals or exceeds the genset output power capacity or the selected output capacity.

3. The method of claim 1 wherein the step of delivering the amount of power from the genset to the load bank/heater to heat exhaust from the genset further comprises delivering power from the genset to the load bank/heater to heat exhaust from the genset to maintain exhaust temperature within a selected range.

4. The method of claim 1 wherein:
    the step of delivering the amount of power to the load bank/heater includes:
        applying power to the load bank/heater during operation in a diesel particulate filter (DPF) regeneration mode;
        determining whether the electrical load demands power during the DPF filter regeneration mode; and
        reducing the amount of power applied to the load bank/heater during the DPF filter regeneration mode in response to the electrical load demanding power during the DPF filter regeneration mode.

5. The method of claim 1 wherein:
    the step of delivering the amount of power to the load bank/heater includes:
        applying power to the load bank/heater during operation in an AT run mode;
        determining whether the electrical load demands power during the AT run mode; and
        reducing the amount of power applied to the load bank/heater during the AT run mode in response to the electrical load demanding power during the AT run mode.

6. A method of distributing power from a genset having an output power capacity to an electrical load powered by the genset and to a load bank/heater in an exhaust after treatment (AT) system coupled to the genset, the method including:
    delivering an amount of power from the genset to the electrical load;
    delivering an amount of power from the genset to the load bank/heater to heat exhaust from the genset;
    monitoring power demand on the genset while delivering power to the electrical load and the load bank/heater;
    determining whether the power demand of the electrical load is increasing at a high rate of change, wherein the high rate of change indicates that the power demand of the electrical load is projected to become greater than at least one of a selected output power capacity and a genset output power capacity;
    reducing the amount of power applied to the load bank/heater in response to the electrical load power demand increasing at the high rate of change to preemptively shed load to prevent the power demand on the genset from becoming greater than at least one of the selected output power capacity and the genset output power capacity;
    determining at least one of whether a selected time window has passed based on data representative of over-load based load shedding operations and whether the power demand of the electrical load has been reduced to a level at or below a selected lower hysteresis level of power demand; and
    restoring the amount of power applied to the load bank/heater in response to at least one of the selected time window passing and the power demand of the electrical load being reduced to a level at or below the selected lower hysteresis level of power demand.

7. The method of claim 6 wherein the high rate of change for power demand is determined with a differential or second order differential of the increase in power demand.

8. The method of claim 6 wherein the step of reducing the amount of power applied to the load bank/heater includes discontinuing the application of power to the load bank/heater when the amount of power demanded by the electrical load about equals or exceeds the genset output power capacity or the selected output capacity.

9. The method of claim 6 wherein the step of delivering the amount of power from the genset to the load bank/heater to heat exhaust from the genset further comprises delivering power from the genset to the load bank/heater to heat exhaust from the genset to maintain exhaust temperature within a selected range.

10. The method of claim 6 wherein:

the step of delivering the amount of power to the load bank/heater includes:

applying power to the load bank/heater during operation in a diesel particulate filter (DPF) regeneration mode;

determining whether the electrical load demands power during the DPF filter regeneration mode; and reducing the amount of power applied to the load bank/heater during the DPF filter regeneration mode in response to the electrical load demanding power during the DPF filter regeneration mode.

11. The method of claim 6 wherein:

the step of delivering the amount of power to the load bank/heater includes:

applying power to the load bank/heater during operation in an AT run mode;

determining whether the electrical load demands power during the AT run mode; and reducing the amount of power applied to the load bank/heater during the AT run mode in response to the electrical load demanding power during the AT run mode.

* * * * *